(12) United States Patent
Sasao et al.

(10) Patent No.: US 11,732,615 B2
(45) Date of Patent: Aug. 22, 2023

(54) STEAM TURBINE HOLLOW BLADE

(71) Applicant: Mitsubishi Heavy Industries, Ltd., Tokyo (JP)

(72) Inventors: Yasuhiro Sasao, Yokohama (JP); Soichiro Tabata, Yokohama (JP); Ryo Takata, Tokyo (JP); Nao Taniguchi, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 17/377,992

(22) Filed: Jul. 16, 2021

(65) Prior Publication Data

US 2022/0018265 A1    Jan. 20, 2022

(30) Foreign Application Priority Data

Jul. 20, 2020    (JP) .................................. 2020-123594

(51) Int. Cl.
  *F01D 25/32*    (2006.01)
  *F01D 9/04*    (2006.01)
  *F01D 5/18*    (2006.01)

(52) U.S. Cl.
  CPC ............... *F01D 25/32* (2013.01); *F01D 5/18* (2013.01); *F01D 9/041* (2013.01); *F05D 2220/31* (2013.01); *F05D 2260/602* (2013.01)

(58) Field of Classification Search
  CPC ........ F01D 25/32; F01D 5/18; F05D 2220/31; F05D 2260/602
  See application file for complete search history.

(56) References Cited

U.S. PATENT DOCUMENTS

| | | | | |
|---|---|---|---|---|
| 6,305,902 B1 * | 10/2001 | Konishi | .................. | F01D 25/32 |
| | | | | 415/115 |
| 8,511,968 B2 * | 8/2013 | Liang | ...................... | F01D 5/187 |
| | | | | 415/115 |
| 8,568,090 B2 * | 10/2013 | Guo | .......................... | F01D 5/18 |
| | | | | 415/169.3 |
| 9,523,283 B2 * | 12/2016 | Uechi | ...................... | F01D 5/189 |
| 10,001,032 B2 * | 6/2018 | Takata | .................... | F01D 25/32 |

(Continued)

FOREIGN PATENT DOCUMENTS

| | | |
|---|---|---|
| EP | 2 224 097 A2 | 9/2010 |
| JP | 2008-133825 A | 6/2008 |
| JP | 2016-138487 A | 8/2016 |

OTHER PUBLICATIONS

Hindi-language Office Action issued in Indian Application No. 202114031465 dated Feb. 28, 2022 with partial English translation (five (5) pages).

*Primary Examiner* — Michael L Sehn
(74) *Attorney, Agent, or Firm* — Crowell & Moring LLP

(57) ABSTRACT

A steam turbine hollow stationary blade is able to reduce the amount of water droplets captured on a blade surface. The steam turbine hollow stationary blade, which has a cavity therein, includes a partition wall dividing the cavity into a pressure chamber on a leading edge side and an exhaust chamber on a trailing edge side, at least one steam inlet hole connecting the pressure chamber and an outside of the stationary blade to each other, and at least one pressure conditioning hole connecting the pressure chamber and the exhaust chamber. Total opening area of the pressure conditioning hole is smaller than total opening area of the steam inlet hole.

7 Claims, 6 Drawing Sheets

(56) References Cited

U.S. PATENT DOCUMENTS

2010/0329847 A1    12/2010    Yamashita et al.
2014/0030065 A1*    1/2014    Nakano .................. F01D 25/32
                                                                           415/115

* cited by examiner

-- PRIOR ART --

STEAM TURBINE HOLLOW BLADE

BACKGROUND OF THE INVENTION

1. Field of the Invention

The present invention relates to a steam turbine hollow stationary blade.

2. Description of the Related Art

In steam turbines, during the process of converting the energy of a steam flowing from a high pressure stage to a low pressure stage into mechanical work, part of the steam condenses into fine water droplets. Therefore, a steam as a gas phase that drives a steam turbine is accompanied by a liquid phase, i.e., fine water droplets, and lower pressure stages see more fine water droplets that accompany the steam. At a low pressure stage, i.e., a last stage or a plurality of last stages, of a steam turbine, fine water droplets are captured on the surfaces of stationary blades. While those fine water droplets are caused to move downstream by the gas phase, they are attracted to each other, forming a liquid film. As the liquid film reaches the trailing edges of the stationary blades, it leaves the blade surfaces as water droplets that accompany the gas phase. The water droplets that have left the stationary blades are of relatively large diameters and some of them can cause erosion on rotor blades that are located downstream.

There is known, in the art, a hollow stationary blade fabricated of plate-shaped blade materials for drawing water droplets into the stationary blade through slits provided to the blade materials that provide blade surfaces (see JP-2016-138487-A, and the like).

PRIOR ART DOCUMENT

Patent Document

Patent Document 1: JP-2016-138487-A

The stationary blade disclosed in JP-2016-138487-A is capable of drawing water droplets captured on the blade surfaces into the blade to a certain extent. However, the slits cannot be formed as long slits extending continuously lengthwise of the blade, but have to be formed partially or intermittently lengthwise of the blade. The stationary blade still has room for improvement as regards ways for dealing with water droplets on the blade surfaces of the stationary blade.

It is an object of the present invention to provide a steam turbine hollow stationary blade that is able to reduce the amount of water droplets captured on a blade surface.

SUMMARY OF THE INVENTION

In order to accomplish the above object, there is provided, according to the present invention, a steam turbine hollow stationary blade, that has a cavity therein, including a partition wall dividing the cavity into a pressure chamber on a leading edge side and an exhaust chamber on a trailing edge side, at least one steam inlet hole connecting the pressure chamber and an outside of the stationary blade to each other, and at least one pressure conditioning hole connecting the pressure chamber and the exhaust chamber, in which total opening area of the pressure conditioning hole is smaller than total opening area of the steam inlet hole.

According to the present invention, the steam turbine hollow stationary blade is able to reduce the amount of water droplets captured on a blade surface.

DESCRIPTION OF THE PREFERRED EMBODIMENTS

A steam turbine hollow stationary blade according to a preferred embodiment of the present invention will be described in detail hereinbelow with reference to the accompanying drawings.

Steam Turbine Electric Power Generation Facility

Figure 1:
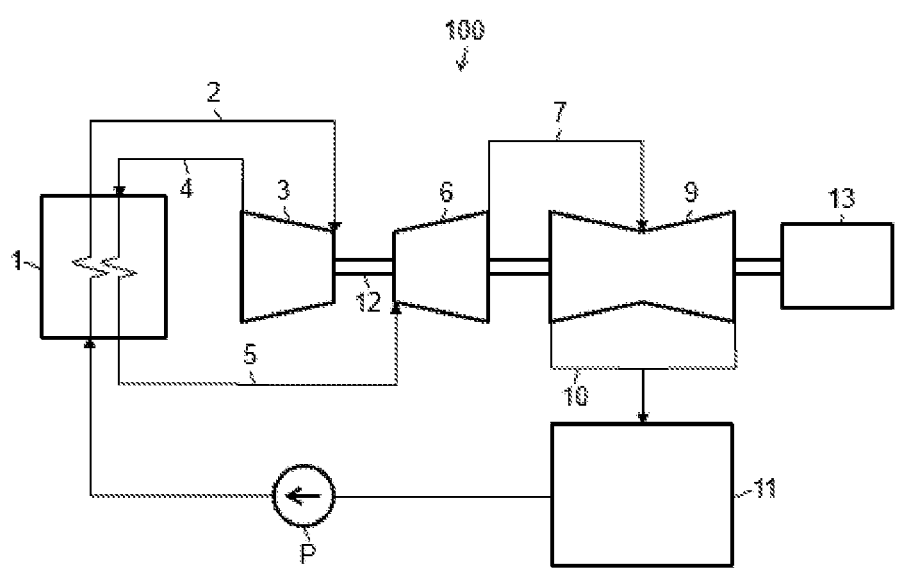
FIG. 1 is a diagram schematically illustrating, by way of example, a steam turbine electric power generation facility incorporating steam turbine hollow stationary blades according to an embodiment of the present invention.

FIG. 1 schematically illustrates, by way of example, a steam turbine electric power generation facility incorporating steam turbine hollow stationary blades according to the embodiment of the present invention. The steam turbine electric power generation facility, denoted by 100 in FIG. 1, includes a steam generating source 1, a high pressure turbine 3, a medium pressure turbine 6, a low pressure turbine 9, a steam condenser 11, and a load apparatus 13.

The steam generating source 1 includes a boiler that heats water supplied from the steam condenser 11 to generate a steam having a high temperature and a high pressure. The steam generated by the steam generating source 1 is introduced through a main steam line 2 into the high pressure turbine 3, actuating the high pressure turbine 3. The steam that has been lowered in temperature and pressure by actuating the high pressure turbine 3 is then introduced through a high pressure-turbine exhaust line 4 into the steam generating source 1 that reheats the steam into a reheated steam.

The reheated steam generated by the steam generating source 1 is introduced through a reheated steam line 5 into the medium pressure turbine 6, actuating the medium pressure turbine 6. The steam that has been lowered in temperature and pressure by actuating the medium pressure turbine 6 is then introduced through a medium pressure turbine exhaust line 7 into the low pressure turbine 9 to drive the low pressure turbine 9. The steam that has been further lowered in temperature and pressure by actuating the low pressure turbine 9 is then introduced through a diffuser 10 into the steam condenser 11. The steam condenser 11 includes cooling water piping, not shown, and condenses the steam into water by way of a heat exchange between the steam introduced into the steam condenser 11 and cooling water flowing through the cooling water piping. The water produced by the steam condenser 11 is delivered again to the steam generating source 1 by a water supply pump P.

The high pressure turbine 3, the medium pressure turbine 6, and the low pressure turbine 9 have respective turbine rotors 12 coupled coaxially to each other. The load apparatus 13 typically includes an electric generator that is coupled to the turbine rotors 12 and driven by the rotational output power from the high pressure turbine 3, the medium pressure turbine 6, and the low pressure turbine 9.

The load apparatus 13 may alternatively include a pump instead of an electric generator. Furthermore, though the steam turbine electric power generation facility 100 is illustrated as including the high pressure turbine 3, the medium pressure turbine 6, and the low pressure turbine 9, it may be devoid of the medium pressure turbine 6. Though the high pressure turbine 3, the medium pressure turbine 6, and the low pressure turbine 9 are illustrated as actuating the common load apparatus 13, the high pressure turbine 3, the medium pressure turbine 6, and the low pressure turbine 9 may drive different load apparatus, respectively. Moreover, the high pressure turbine 3, the medium pressure turbine 6, and the low pressure turbine 9 may be divided into two groups, i.e., two turbines and one turbine, and each of the groups may drive a load apparatus of its own. In addition, though a boiler has been referred to as the steam generating source 1, the steam generating source 1 may include a heat recovery steam generator (HRSG) that uses the waste heat of a gas turbine. In other words, the steam turbine hollow stationary blade, to be described below, according to the present embodiment may be used in a combined-cycle electric power generation facility. The steam turbine hollow stationary blade may also be used in steam turbines for use in geothermal or nuclear electric power generation.

Steam Turbine

Figure 2:
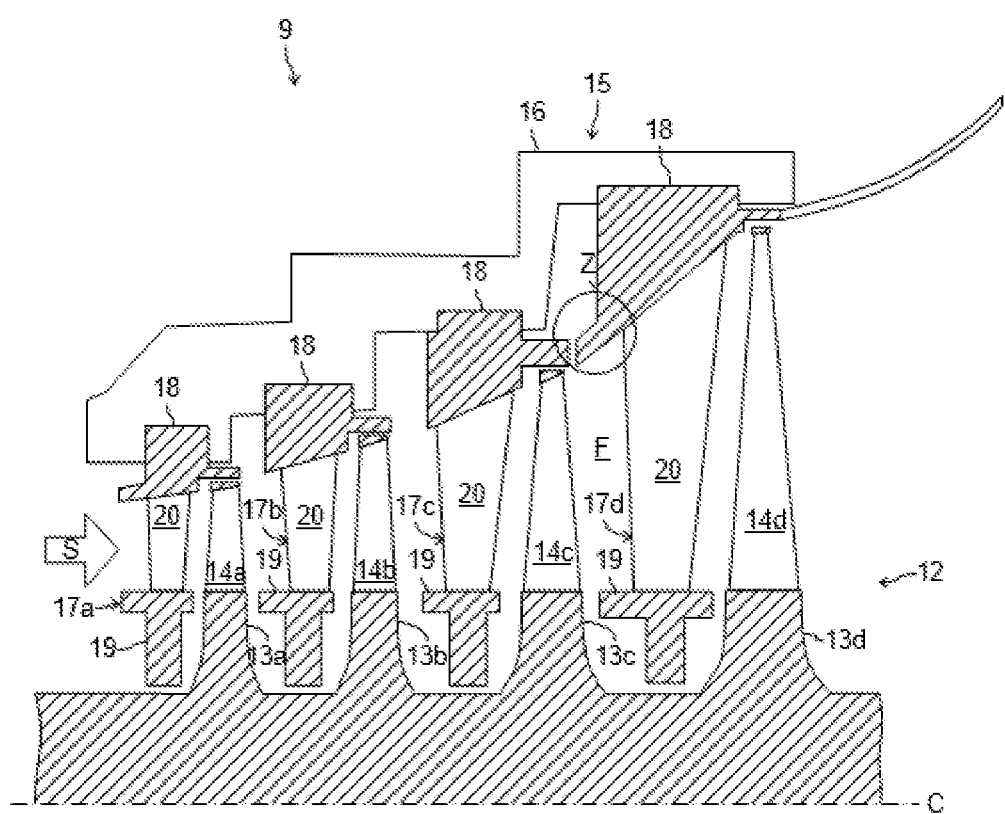
FIG. 2 is a cross-sectional view of a steam turbine including the steam turbine hollow stationary blades according to the embodiment, the view being taken along a plane extending through the central axis of a turbine rotor around which the turbine rotor rotates.

FIG. 2 is a cross-sectional view of the low pressure turbine 9 taken along a plane extending through the central axis of the turbine rotor 12 around which the turbine rotor 12 rotates, i.e., taken along a meridian plane. As illustrated in FIG. 2, the low pressure turbine 9 includes the turbine rotor 12 and a stator 15 that covers the turbine rotor 12. The diffuser is disposed at the exits of the stator 15. In the present description, the direction in which the turbine rotor 12 rotates will be referred to as "circumferential direction," the direction in which the central axis, denoted by C, around which the turbine rotor 12 rotates as "axial direction," and the direction in which the radius of the turbine rotor 12 extends as "radial direction." According to the present embodiment, the central axis C around which the turbine rotor 12 rotates extends horizontally.

The turbine rotor 12 includes a plurality of rotor disks 13a through 13d and a plurality of groups of rotor blades 14a through 14d. The rotor disks 13a through 13d are disk-shaped members that are axially arrayed along the central axis C. The rotor disks 13a through 13d may alternate with spacers, not shown. The rotor blades 14d are disposed at circumferentially equally spaced intervals on an outer circumferential surface of the rotor disk 13d. Similarly, the rotor blades 14a through 14c are disposed at circumferentially equally spaced intervals on respective outer circumferential surfaces of the rotor disks 13a through 13c, respectively. The rotor blades 14a through 14d extend radially outwardly from the outer circumferential surfaces of the rotor disks 13a through 13d and are disposed in a tubular working medium flow channel F. The energy of a steam S flowing through the working medium flow channel F is converted by the rotor blades 14a through 14d into mechanical work, rotating the turbine rotor 12 in unison with the rotor blades 14a through 14d around the central axis C.

The stator 15 includes a casing 16 and a plurality of groups of diaphragms 17a through 17d. The casing 16 includes a tubular member providing an outer circumferential wall of the low pressure turbine 9. The diaphragms 17a through 17d are mounted on an inner circumferential surface of the casing 16. The diaphragms 17a through 17d are segments that provide arrays of stationary blades. Each of the groups of the diaphragms 17a through 17d includes a plurality of outer diaphragm rings 18, a plurality of inner diaphragm rings 19, and a plurality of stationary blades 20 that are formed integrally with each other. The diaphragms 17a through 17d are disposed at circumferentially spaced intervals in an annular or ring pattern, and provide a plurality of stages, i.e., four stages in FIG. 2, including arrays of stationary blades 20.

The outer diaphragm rings 18 have inner circumferential surfaces defining outer circumferential surfaces of the working medium flow channel F, and are supported on inner circumferential surfaces of the casing 16. The outer diaphragm rings 18 are disposed at circumferentially spaced intervals in an annular or ring pattern. According to the present embodiment, the inner circumferential surfaces of the outer diaphragm rings 18 are inclined radially outwardly in a downstream direction, i.e., in a rightward direction in FIG. 2. The inner diaphragm rings 19 have outer circumferential surfaces defining inner circumferential surfaces of the working medium flow channel F, and are disposed radially inwardly of the outer diaphragm rings 18. The inner diaphragm rings 19 disposed at circumferentially spaced intervals in an annular or ring pattern. In each of the stages, the stationary blades 20 are disposed at circumferentially spaced intervals and extend radially, joining the inner diaphragm rings 19 to the outer diaphragm rings 18.

The stationary blades 20 in each group of diaphragms and the rotor blades disposed downstream thereof make up one stage. According to the present embodiment, the stationary blades 20 of the diaphragms 17a and the rotor blades 14a make up a first stage, i.e., an initial stage. Similarly, the stationary blades 20 of the diaphragms 17b and the rotor blades 14b make up a second stage, the stationary blades 20 of the diaphragms 17c and the rotor blades 14c make up a third stage, and the stationary blades 20 of the diaphragms 17d and the rotor blades 14d make up a fourth stage, i.e., a last stage.

Steam Turbine Hollow Stationary Blade

Figure 3:
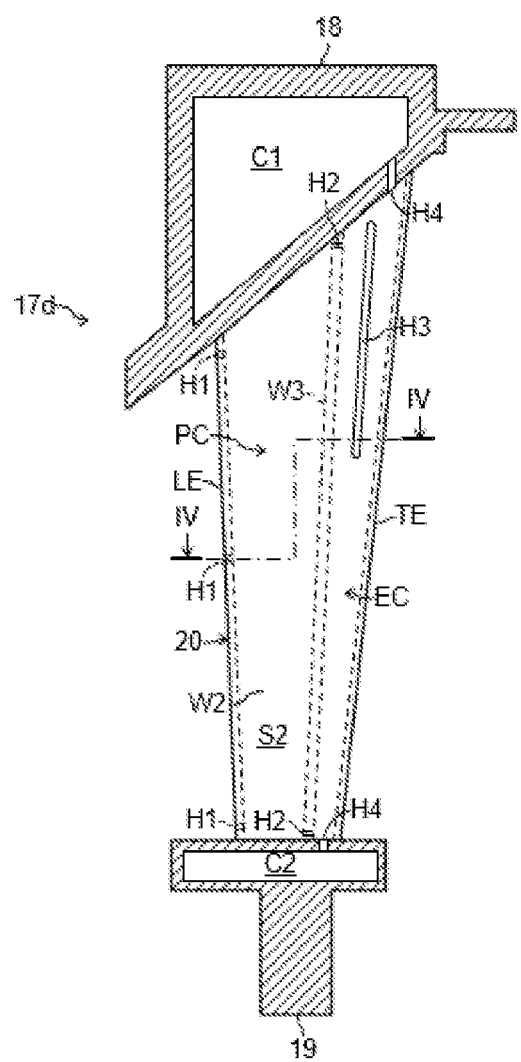
FIG. 3 is an enlarged view of a diaphragm at a last stage of the steam turbine illustrated in FIG. 2.
Figure 4:
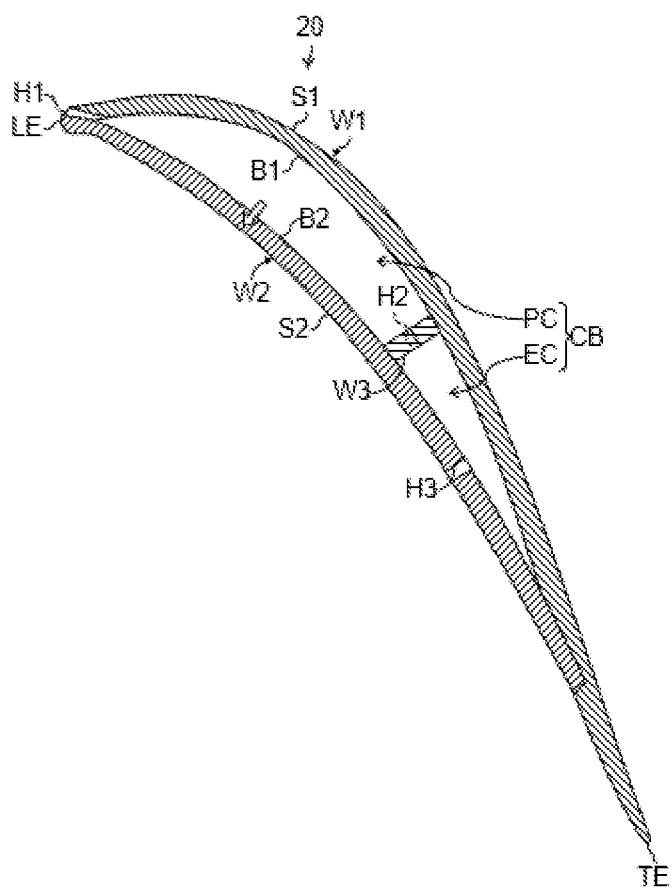
FIG. 4 is a cross-sectional view of a steam turbine hollow stationary blade, taken along line IV-IV of FIG. 3.

FIG. 3 illustrates, at an enlarged scale, a diaphragm at the last stage, and FIG. 4 illustrates a hollow stationary blade in a cross section taken along line IV-IV of FIG. 3. FIGS. 3 and 4 illustrate structural details of one of the diaphragms 17d at the last stage. The diaphragms at the other stages may have the same structural details. Particularly, the illustrated structural details should preferably be applied to stationary blades at low pressure stages where a wet steam flows, specifically, stationary blades at a plurality of last stages of the low pressure turbine 9. The stationary blade 20 illustrated in FIGS. 3 and 4 includes a suction side blade material W1, a pressure side blade material W2, and a partition wall W3. The stationary blade 20 has at least one steam inlet hole H1, at least one pressure conditioning hole H2, at least one slit H3, and at least one exhaust hole H4 (FIG. 3). These holes are provided as fluid flow channels in the stationary blade 20. Each of the steam inlet hole H1, the pressure conditioning hole H2, and the exhaust hole H4 is shaped as a small circular hole, and the slit H3 as an oblong hole, for example.

Each of the suction side blade material W1 and the pressure side blade material W2 is made of sheet metal bent to shape on a press. The suction side blade material W1 has a face side providing a suction side surface S1 of the stationary blade 20 and is curved such that the suction side surface S1 is projected as viewed in a radial direction in FIG. 4. The pressure side blade material W2 has a face side providing a pressure side surface S2 of the stationary blade 20 and is curved such that the pressure side surface S2 is depressed as viewed in the radial direction in FIG. 4. The suction side blade material W1 and the pressure side blade material W2 have both ends along their chords, providing a leading edge LE and a trailing edge TE, respectively, of the stationary blade 20. The both ends of the suction side blade material W1 and the pressure side blade material W2, that provide the leading edge LE and the trailing edge TE, are superposed one on the other and joined together by welding, thereby constructing the stationary blade 20. As a result, a cavity CB is formed inside the stationary blade 20, that is, between a reverse side B1 of the suction side blade material W1 and a reverse side B2 of the pressure side blade material W2.

The partition wall W3 acts as a dividing plate that divides the cavity CB into a pressure chamber, i.e., an ante-chamber, PC on the leading edge LE side and a exhaust chamber, i.e., a post-chamber, EC on the trailing edge TE side, and separates the pressure chamber PC and the exhaust chamber EC from each other. The partition wall W3 extends continuously lengthwise of the stationary blade 20 from the inner circumferential side end toward outer circumferential side end thereof and has both end faces disposed widthwise thereacross, i.e., thicknesswise of the stationary blade 20, that are joined along their entire length to the reverse sides B1 and B2 of the suction side blade material W1 and the pressure side blade material W2.

The steam inlet hole H1 is a hole that connects the pressure chamber PC to the outside of the stationary blade 20, i.e., the working medium flow channel F in which the steam S flows as a working medium or a space outside of the stationary blade 20. The steam inlet hole H1 should preferably be disposed to have its entrance positioned as closely to a maximum blade surface pressure point as possible on the basis of a fluid flow analysis or the like performed if necessary. According to the present embodiment, the steam inlet hole H1 is disposed in the leading edge LE. Though the number of steam inlet holes H1 may appropriately be changed, each stationary blade 20 according to the present embodiment has a total of three steam inlet holes H1 including one at the inner circumferential portion of the stationary blade 20, one at the outer circumferential portion of the stationary blade 20, and one intermediate therebetween in the leading edge LE (see FIG. 3). The steam inlet holes H1 can be formed by drilling or electric discharge machining after the suction side blade material W1 and the pressure side blade material W2 have been joined to each other.

Specifically, for forming the steam inlet holes H1 in the leading edge LE, the weld bead on the butt welding joint between the suction side blade material W1 and the pressure side blade material W2 on the leading edge LE may include gaps intentionally left therein for use as the steam inlet holes H1. Alternatively, partial recesses may be formed in at least one of the opposite ends of the suction side blade material W1 and the pressure side blade material W2 on the leading edge LE, and then the suction side blade material W1 and the pressure side blade material W2 may be joined together on the leading edge LE except for the recesses that are to be used as the steam inlet holes H1.

The pressure conditioning hole H2 is a fluid communication hole that connects the pressure chamber PC and the exhaust chamber EC. Though the number of pressure conditioning holes H2 may appropriately be changed, each stationary blade 20 according to the present embodiment has a total of two pressure conditioning holes H2, one at the inner circumferential side of the stationary blade 20 and one at the outer circumferential side of the stationary blade 20 in the partition wall W3 (see FIG. 3). The total opening area of the pressure conditioning holes H2 is smaller than the total opening area of the steam inlet holes H1 in order to increase the pressure in the pressure chamber PC due to the steam introduced from the steam inlet holes H1. The ratio between the total opening area of the steam inlet holes H1 and the total opening area of the pressure conditioning holes H2 is set for the purpose of increasing the pressure in the pressure chamber PC to the extent that the pressure chamber PC is higher in temperature than a turbulent boundary layer formed on the stationary blade 20 particularly along the pressure side surface S2 thereof. Therefore, the ratio between the total opening area of the steam inlet holes H1 and the total opening area of the pressure conditioning holes H2 is determined on the basis of the pressures at the entrances of the steam inlet holes H1, the pressures at the exits of the pressure conditioning holes H2, the temperature of the turbulent boundary layer, and the like. The higher the static pressure in the pressure chamber PC is, the higher the saturated steam temperature in the pressure chamber PC is.

The slit H3 is an oblong hole that provides fluid communication between the exhaust chamber EC and the outside of the stationary blade 20. The slit H3 extends lengthwise of the blade in an area on the outer circumferential side of the blade, and penetrates the pressure side blade material W2. According to the present embodiment, the slit H3 is illustrated as being provided to the pressure side blade material W2. However, the slit H3 may be provided to the suction side blade material W1 or slits H3 may be provided to both the suction side blade material W1 and the pressure side blade material W2. At any rate, the slit H3 should provide fluid communication between the exhaust chamber EC and the outside of the stationary blade 20 and should have its exit and entrance kept from facing into the pressure chamber PC.

The exhaust holes H4 are provided to an inner circumferential wall of the outer diaphragm ring 18 and an outer circumferential wall of the inner diaphragm ring 19, as through holes. The exhaust chamber EC is held in fluid communication with a cavity C1 provided inside the outer diaphragm ring 18 and a cavity C2 provided inside the inner diaphragm ring 19 through these exhaust holes H4. The cavities C1 and C2 are connected to the steam condenser 11 or other suction apparatus through an exhaust pipe, not shown. The exhaust chamber EC is thus connected to the steam condenser 11 or other suction apparatus through the exhaust holes H4 and the cavities C1 and C2.

COMPARATIVE EXAMPLE

Figure 5:
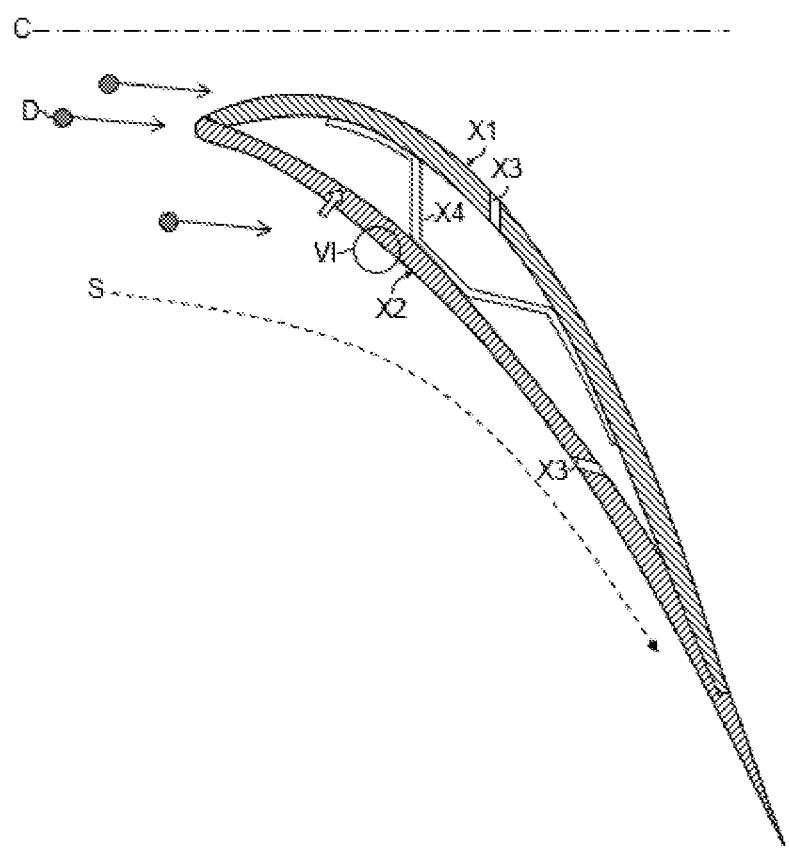
FIG. 5 is a cross-sectional view of a steam turbine hollow stationary blade according to a comparative example.

FIG. 5 illustrates, in cross section, a steam turbine hollow stationary blade according to a comparative example, and corresponds to FIG. 4 according to the present embodiment. The stationary blade illustrated in FIG. 5 is also of a hollow structure provided by joining a suction side blade material X1 and a pressure side blade material X2 to each other. Slits X3 are provided to both the suction side blade material X1 and the pressure side blade material X2. Though a leaf spring X4 is interposed between the suction side blade material X1 and the pressure side blade material X2 in order to maintain a desired blade strength, the stationary blade includes no partition wall dividing the cavity in the stationary blade. The leaf spring X4 does not divide the cavity in the stationary blade, and develops no differential pressure thereacross in the cavity. As with the exhaust chamber EC according to the present embodiment, the cavity in the stationary blade is connected to a steam condenser, for example, and develops a lower pressure therein compared to the outside of the stationary blade. With the stationary blade illustrated in FIG. 5, water droplets captured by the blade surfaces are drawn through the slits X3 into the blade.

Principles of Capturing of Water Droplets Onto Blade Surfaces

Water droplets are captured onto the blade surfaces of the stationary blade in one of roughly three ways, i.e., inertial capturing, turbulent transport capturing, and wall condensation. Inertial capturing refers to a phenomenon in which fine water droplets, which generally have a particle diameter of 2 μm or less, accompanied by a steam are captured by a blade surface upon inertial collision therewith. Specifically, as indicated by the broken-line arrow in FIG. 5, a steam S as a working medium flows toward an array of stationary blades in a direction along the central axis C, for example, turns along the blade surfaces, and passes between adjacent ones of the stationary blades. At this time, some of fine water droplets D accompanied by the stream S collide with the blade surfaces under inertial forces and are captured by the blade surfaces.

Figure 6:
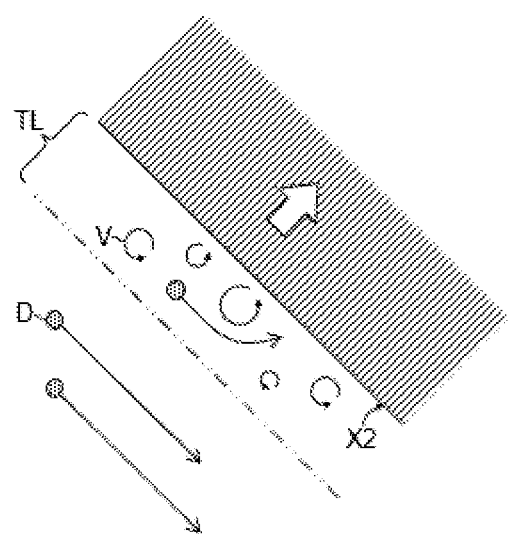
FIG. 6 is an enlarged view of a section VI of FIG. 5, illustrated to explain turbulent transport capturing.

Turbulent transport capturing refers to a phenomenon in which fine water droplets moving on along a blade surface in a turbulent boundary layer formed along the blade surface are entrained by vortexes and captured by the blade surface. FIG. 6 is an enlarged view of a section VI of FIG. 5, illustrated to explain turbulent transport capturing.

As illustrated in FIG. 6, a turbulent boundary layer TL where countless fine vortexes V exist is formed thinly along a blade surface of a stationary blade. Fine water droplets D accompanied by a steam as a gas phase and flowing along the blade surface in a main stream spaced from the blade surface, i.e., in an area farther than the two-dot-and-dash line in FIG. 6 from the blade surface are normally not captured by the blade surface. In the turbulent boundary layer TL, however, an exchange of momentum is caused to occur between a blade surface side and a main stream side by the fine vortexes V, transporting fine water droplets D toward the blade surface that captures the fine water droplets D.

In contrast, wall condensation refers to a phenomenon in which a steam flowing in the vicinity of a blade surface is condensed on the blade surface. With the structure illustrated in FIG. 5, the cavity in the stationary blade is commensurate with an exhaust vacuum pressure and lower in temperature than the outside of the stationary blade. In FIGS. 5 and 6, the direction in which heat is transferred thicknesswise of the pressure side blade material X2 is indicated by the outlined arrow. At a low pressure stage, the steam S flowing through the working medium flow channel F becomes supercooled as a whole. Even in the turbulent boundary layer TL where the steam temperature is high due to aerodynamic heating, the steam S stays supercooled particularly on the pressure side of the stationary blade because the saturated steam temperature is high owing to a pressure buildup. In the turbulent boundary layer TL, consequently, the steam on the pressure side surface X2 that has been cooled by the cavity commensurate with the exhaust vacuum pressure is condensed, growing water droplets on the blade surface. It has recently been newly found by inventor's intensive research that the ratio of water droplets appearing on the blade surface of the stationary blade due to water condensation to water droplets captured by the blade surface is unexpectedly high.

Operation of the Embodiment

The last stage of the low pressure turbine 9 will be described below by way of example. As described above, water droplets are captured mainly on the pressure side surface S2 by the stationary blade due to inertial capturing and turbulent transport capturing. These water drops move on the blade surface toward the trailing edge TE under shearing forces of the steam as a gas phase, and are drawn into the exhaust chamber EC through the slit H3 and introduced into the steam condenser 11 through the exhaust holes H4.

At this time, according to the present embodiment, a high pressure steam flows from the leading edge LE where the blade surface pressure is high into the pressure chamber PC through the steam inlet holes H1. Since the total opening area of the pressure conditioning holes H2 is smaller than the total opening area of the steam inlet holes H1, the pressure chamber PC undergoes a pressure buildup and becomes higher in temperature than the steam flowing in the main stream outside of the stationary blade in the working medium flow channel F. According to the present embodiment, unlike the comparative example illustrated in FIG. 5, heat is transferred from the pressure chamber PC at the higher temperature to the outside of the stationary blade at the lower temperature as indicated by the outlined arrow in FIG. 4. As a result, wall condensation occurs on the reverse sides B1 and B2 of the suction side blade material W1 and the pressure side blade material W2 in the pressure chamber PC, and the latent heat of condensation is added to the heat source, further heating the suction side blade material W1 and the pressure side blade material W2. With the blade surfaces being thus heated, the turbulent boundary layer becomes higher in temperature owing to the saturated steam temperature, restraining wall condensation from occurring on a blade surface, e.g., the pressure side surface S2.

Furthermore, the wall condensation that occurs in the pressure chamber PC reduces the volume of the steam in the pressure chamber PC, causing a subsequent heated steam to flow from the steam inlet holes H1 into the pressure chamber PC, and thus the pressurization in the pressure chamber PC, the wall condensation, and the heating of the blade materials due to latent heat of condensation as described above occur sequentially.

The water droplets condensed on the reverse sides B1 and B2 of the suction side blade material W1 and the pressure side blade material W2 in the pressure chamber PC flow out of the pressure chamber PC into the exhaust chamber EC through the pressure conditioning holes H2, and are then discharged, together with water droplets drawn in through the slit H3, out of the exhaust chamber EC through the exhaust holes H4.

Advantages (1) As described above, a steam introduced through the steam inlet holes H1 into the pressure chamber PC develops a pressure buildup in the pressure chamber PC, causing wall condensation on the reverse sides B1 and B2 of the suction side blade material W1 and the pressure side blade material W2, and the latent heat of condensation heats the suction side blade material W1 and the pressure side blade material W2, making the temperature of the turbulent boundary layer higher than the saturated steam temperature. This reduces wall condensation on the blade surface, restraining water droplets from growing on the blade surface and hence reducing the amount of water droplets captured by the blade surface.

(2) The latent heat of condensation in the pressure chamber PC heats the turbulent boundary layer through the pressure side blade material W2, evaporating some of the fine water droplets that can be captured due to turbulent transport capturing by the blade surface, and reducing the amount of water droplets captured due to turbulent transport capturing. Moreover, the increase in the temperature of the blade surface can evaporate some of the fine water droplets that are captured due to inertial capturing or turbulent transport capturing by the blade surface. This is also expected to reduce the amount of water droplets captured by the blade surface.

(3) In addition, according to the comparative example illustrated in FIG. 5, the pressure and temperature in the cavity of the stationary blade are equivalent to those in the exhaust chamber, and the internal temperature thereof is a low temperature equivalent to the saturated temperature in the exhaust chamber. Therefore, while in operation, heat is dumped at all times to the cavity in the stationary blade from surrounding components, e.g., the outer diaphragm ring, the inner diaphragm ring, and the casing.

According to the present embodiment, in contrast, since the pressure chamber PC is heated and acts as a heat insulating chamber, the heat of the surrounding components is prevented from being consumed, and thus energy efficiency is expected to increase.

(4) A structure for heating stationary blades by introducing a high-temperature steam extracted from a high pressure stage through steam extraction piping may be worth considering. However, such a structure requires separate steam extraction piping to be installed for introducing a steam. This also holds true for a separate heating apparatus for heating stationary blades. The structure is less feasible and highly costly.

According to the present embodiment, in contrast, inasmuch as a steam is introduced from the leading edge LE of the stationary blade into the pressure chamber PC therein, piping and a heating apparatus do not need to be additionally installed, and the stationary blade is highly feasible and less costly.

(5) Unlike a structure for introducing a steam extracted from a high pressure stage to stationary blades, the amount of a heated steam supplied to the pressure chamber PC is limited to an amount commensurate with the rate of a steam that changes in phase to water by wall condensation in the pressure chamber PC, requiring no more steam than necessary to pressurize the pressure chamber PC. Furthermore, latent heat of condensation by wall condensation that has occurred in the pressure chamber PC is effectively utilized as a heating source for heating the blade materials, resulting in excellent energy efficiency also in this regard.

(6) With the structure illustrated in FIG. 5, wall condensation occurs on the blade surface, and water droplets generated on the blade surface by the wall condensation is drawn into the stationary blade. According to the present embodiment, in contrast, since wall condensation occurs in the stationary blade, no work is required to draw water droplets generated by the wall condensation into the stationary blade. This also contributes to improved energy efficiency.

(7) Generally, inasmuch as the steam inlet holes H1 are positioned at the leading edge LE of the stationary blade where a maximum blade surface pressure point is located, a steam can efficiently be introduced through the steam inlet holes H1 into the pressure chamber PC. The pressure chamber PC can thus be pressurized effectively.

(8) Since a plurality of stationary blades are circumferentially arrayed to provide an annular array of stationary blades, some of the stationary blades belonging to one stage have their inner circumferential side positioned downwardly in the gravitational direction and some of the stationary blades belonging to the same stage have their outer circumferential side positioned downwardly in the gravitational direction in the structure where the central axis around which the turbine rotor rotates lies horizontal. According to the present embodiment, since the pressure conditioning holes H2 are provided to the partition wall W3 at both the inner and outer circumferential sides thereof, not all the pressure conditioning holes H2 are soaked in water at one time regardless of which of the inner and outer circumferential sides of the stationary blade is positioned downwardly in the gravitational direction. The pressure conditioning holes H2 do not need to be changed in position depending on the circumferential position where the stationary blade is positioned, resulting in a merit of uniformly shaped stationary blades at one stage.

The pressure conditioning holes H2 double as drain holes of the pressure chamber PC. However, even if a steam introduced into the pressure chamber PC is condensed in its entirety into water, the water has a volume that is about 1/1000 of the volume of the steam. Therefore, the total opening area of the pressure conditioning holes H2 may be of a value determined in view of their pressure conditioning function in the pressure chamber PC by distributing the pressure conditioning holes H2 on the inner and outer circumferential sides of the stationary blade or either one of the inner and outer circumferential sides of the stationary blade, rather than setting the total opening area of the pressure conditioning holes H2 to an unnecessarily large value.

(9) As the stationary blade has the slit H3 that connects the exhaust chamber EC to the outside of the stationary blade, water droplets are restrained from being generated due to wall condensation and water droplets captured due to inertial capturing or turbulent transport capturing by the blade surface can be drawn out and removed from the blade surface.

(10) The stationary blade has the exhaust holes H4 that connect the exhaust chamber EC to the steam condenser 11. Although a structure in which the exhaust chamber EC is connected to a separate vacuum suction apparatus may be worth considering, no piping and installation need to be added by connecting the exhaust chamber EC to the steam condenser 11 included in the steam turbine electric power generation facility (see FIG. 1) that incorporates the stationary blades according to the present embodiment.

Modifications

The arrangement in which the steam inlet holes H1 are provided to the leading edge LE of each of the stationary blades has been described above by way of example. However, the steam inlet holes H1 may suffice to connect a high-pressure area around the stationary blade and the pressure chamber PC to each other and to have a function to allow a high pressure steam to flow into the pressure chamber PC. Therefore, the steam inlet holes H1 are not limited in position to the leading edge LE, but may have their entrances facing an area where the pressure increases to a required value or higher while the steam turbine is operating. For example, the steam inlet holes H1 may have their entrances facing the pressure side surface S2 or a drain catcher in a section denoted by Z in FIG. 2.

The slit H3 has been illustrated as being provided to only the pressure side of the stationary blade. However, the slit H3 may be provided to the suction side of the stationary blade or in both the suction and pressure sides of the stationary blade, as descried above. The slit H3 has been illustrated as a single slit in the outer circumferential side of the stationary blade. However, the slits H3 may be provided intermittently along the entire length of the stationary blade, or a plurality of slits H3 may be provided in the chord length direction. In case the ratio of the volume of the exhaust chamber EC to the volume of the cavity CB in the stationary bale is small, the slit H3 may be omitted.

The arrangement in which the drain produced in the pressure chamber PC is discharged into the exhaust chamber EC through the pressure conditioning holes H2 has been illustrated above. However, insofar as the pressure conditioning holes H2 are able to achieve a pressurizing capability required for pressurizing the pressure chamber PC, a drain hole dedicated for discharging the drain may be added to the pressure chamber PC in addition to the pressure conditioning holes H2.

DESCRIPTION OF REFERENCE CHARACTERS

11: Steam condenser
20: Steam turbine hollow stationary blade
CB: Cavity
EC: Exhaust chamber
H1: Steam inlet hole
H2: Pressure conditioning hole
H3: Slit
H4: Exhaust hole
LE: Leading edge
PC: Pressure chamber
W3: Partition wall

What is claimed is:

1. A steam turbine hollow stationary blade, that has a cavity therein, comprising:
    a partition wall dividing the cavity into a pressure chamber on a leading edge side and an exhaust chamber on a trailing edge side;
    at least one steam inlet hole connecting the pressure chamber and an outside of the stationary blade to each other, wherein the at least one steam inlet hole is positioned on a leading edge of the stationary blade; and
    at least one pressure conditioning hole connecting the pressure chamber and the exhaust chamber, wherein total opening area of the at least one pressure conditioning hole is smaller than total opening area of the at least one steam inlet hole such that a pressure in the pressure chamber is increased to the extent that the pressure chamber is higher in temperature than a turbulent boundary layer formed on the stationary blade along the pressure side surface thereof;
    the at least one steam inlet hole is a hole that connects the pressure chamber to a working medium flow channel in which the steam flows as a working medium.

2. The steam turbine hollow stationary blade according to claim 1, wherein
    the at least one pressure conditioning hole is provided to the partition wall at both inner and outer circumferential sides of the partition wall.

3. The steam turbine hollow stationary blade according to claim 1, further comprising:
    a slit connecting the exhaust chamber to the outside of the stationary blade.

4. The steam turbine hollow stationary blade according to claim 1, further comprising:
    an exhaust hole connecting the exhaust chamber to a steam condenser.

5. A steam turbine hollow stationary blade, that has a cavity therein, comprising:
    a partition wall dividing the cavity into a pressure chamber on a leading edge side and an exhaust chamber on a trailing edge side;
    at least one steam inlet hole connecting the pressure chamber and an outside of the stationary blade to each other; and
    at least one pressure conditioning hole connecting the pressure chamber and the exhaust chamber, wherein total opening area of the at least one pressure conditioning hole is smaller than total opening area of the at least one steam inlet hole such that a pressure in the pressure chamber is increased to the extent that the pressure chamber is higher in temperature than a turbulent boundary layer formed on the stationary blade along the pressure side surface thereof; and
    the at least one steam inlet hole is a hole that connects the pressure chamber to a working medium flow channel in which the steam flows as a working medium, wherein the at least one pressure conditioning hole is provided to the partition wall at both inner and outer circumferential sides of the partition wall.

6. The steam turbine hollow stationary blade according to claim 5, further comprising:
    a slit connecting the exhaust chamber to the outside of the stationary blade.

7. The steam turbine hollow stationary blade according to claim 5, further comprising:
    an exhaust hole connecting the exhaust chamber to a steam condenser.

* * * * *